(12) United States Patent
Palermo et al.

(10) Patent No.: US 7,215,924 B2
(45) Date of Patent: May 8, 2007

(54) TECHNIQUES FOR INDUCTIVE COMMUNICATION SYSTEMS

(75) Inventors: Vincent Palermo, Westford, MA (US); Charles M. Marshall, North Andover, MA (US); Timothy E. White, Acton, MA (US); Stephen A. Voegelin, Reading, MA (US); Jeffrey R. LaFranchise, Newburyport, MA (US)

(73) Assignee: Aura Communications Technology, Inc., North Andover, MA (US)

( * ) Notice: Subject to any disclaimer, the term of this patent is extended or adjusted under 35 U.S.C. 154(b) by 0 days.

(21) Appl. No.: 11/213,624

(22) Filed: Aug. 26, 2005

(65) Prior Publication Data

US 2006/0073825 A1    Apr. 6, 2006

Related U.S. Application Data

(60) Division of application No. 10/100,229, filed on Mar. 15, 2002, now abandoned, which is a continuation-in-part of application No. 10/004,989, filed on Dec. 3, 2001, which is a continuation-in-part of application No. 09/942,372, filed on Aug. 29, 2001, now abandoned.

(60) Provisional application No. 60/301,529, filed on Jun. 28, 2001, provisional application No. 60/296,229, filed on Jun. 6, 2001, provisional application No. 60/276,398, filed on Mar. 16, 2001.

(51) Int. Cl.
H04B 7/00    (2006.01)
H04B 1/38    (2006.01)
H04B 1/40    (2006.01)
H04M 1/00    (2006.01)

(52) U.S. Cl. .................. 455/41.1; 455/550.1; 455/561; 455/88; 455/41.2

(58) Field of Classification Search ...... 455/41.1–41.3, 455/3.06, 3.05, 63.4, 66.1, 67.11, 410–411, 455/524–526, 418–421, 507–508, 550.1, 455/556.1–556.2, 557, 561, 569.1, 575.2, 455/575.7, 77–78, 101, 108, 115.1–115.3, 455/197.1, 197.2, 62, 63.1, 67.13, 67.14, 455/73, 466, 554.2, 562.1, 513, 509, 110, 455/126, 355, 424–425, 132–136, 87–88, 455/516–520; 379/55.1, 56.3; 343/745–752; 341/15; 340/870.31, 870.32; 370/915, 336, 370/468, 508, 347, 458; 381/150, 163, 71.7
See application file for complete search history.

(56) References Cited

U.S. PATENT DOCUMENTS 5,661,459 A  *  8/1997  Belcher .................... 340/573.4
5,771,438 A  *  6/1998  Palermo et al. ............ 455/41.1
5,912,925 A  *  6/1999  Palermo et al. ............. 375/258

(Continued)

Primary Examiner—Meless Zewdu
(74) Attorney, Agent, or Firm—Hamilton, Brook, Smith & Reynolds, P.C.

(57) ABSTRACT

Contents of one or more received messages can be analyzed to determine whether a transceiver device generating the inductive field has already been programmed with a unique communication code. If not, bidirectional communications can be established to program the transceiver device with a unique communication code over an inductive link. Orientation or position of a transceiver device can be used to initiate a process for programming a communication code. Generally, the communication code can define a unique relationship between two or more transceiver devices.

17 Claims, 16 Drawing Sheets

U.S. PATENT DOCUMENTS 5,982,764 A * 11/1999 Palermo et al. ............. 370/345
2002/0164953 A1 * 11/2002 Curtis ........................ 455/41
2002/0168940 A1 * 11/2002 Heijenk et al. ............... 455/41

* cited by examiner

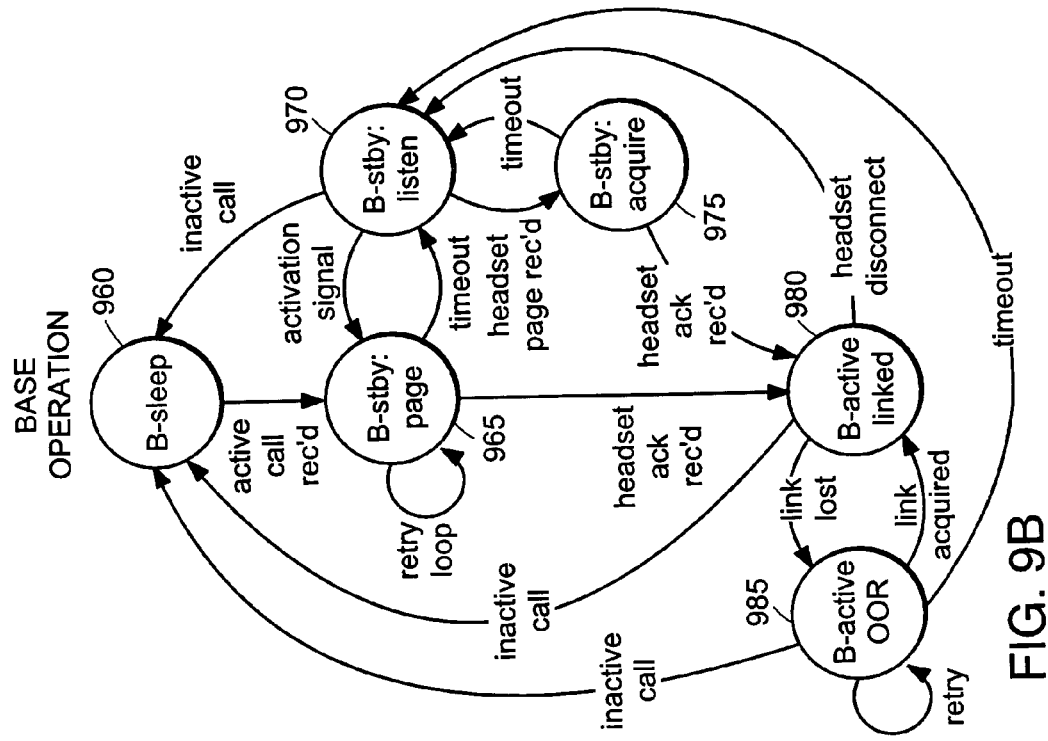
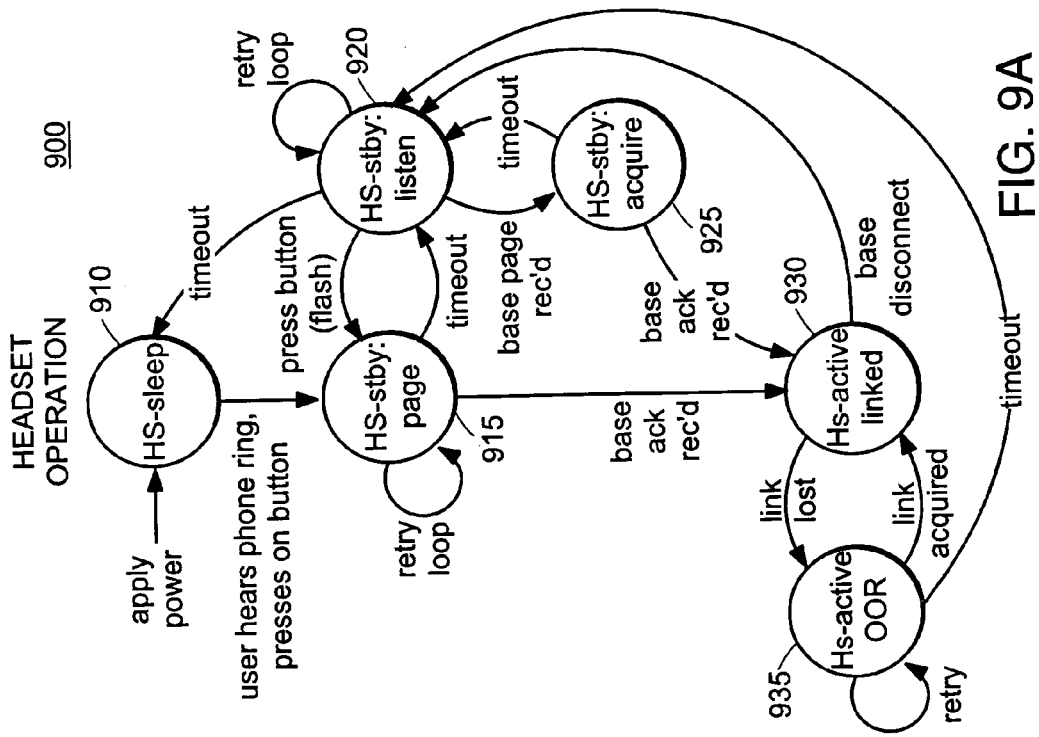
FIG. 9B
FIG. 9A

TECHNIQUES FOR INDUCTIVE COMMUNICATION SYSTEMS

RELATED APPLICATION(S)

This application is a divisional of U.S. application Ser. No. 10/100,229, filed Mar. 15, 2002 now abandoned, which is a continuation-in-part of U.S. application Ser. No. 10,004,989 filed Dec. 3, 2001 and U.S. application Ser. No. 09/942,372 filed Aug. 29, 2001 now abandoned, and claims the benefit of U.S. Provisional Application No. 60/301,529 filed on Jun. 28, 2001, U.S. Provisional Application No. 60/296,229 filed Jun. 6, 2001 and U.S. Provisional Application No. 60/276,398 filed on Mar. 16, 2001. The entire teachings of the above applications are incorporated herein by reference.

BACKGROUND OF THE INVENTION

Transducers have been incorporated in transceivers to transmit and receive inductive fields. In a typical application, each of two transceiver devices supporting bi-directional communication includes two specifically tuned transducers, one of which is tuned for transmitting while the other is tuned for receiving.

Interference can occur among transceiver devices when a common carrier frequency is used by the transceivers to simultaneously transmit data information. In this instance, it is likely that an additional transceiver device within communication range can Aeavesdrop@ and receive information originally intended for another transceiver. This can be annoying or even detrimental if the communication was intended to be confidential.

Unlike RF (Radio Frequency) antennas, inductive transducers couple to each other via magnetic flux. Thus, unique problems arise when multiple transceiver devices attempt to share an available bandwidth to communicate with each other.

SUMMARY OF THE INVENTION

The present invention is directed towards an inductive communication system in which messages are received at a transceiver device over an inductive field.

Contents of one or more received messages can be analyzed to determine whether a transceiver device generating the inductive field has already been programmed with a unique communication code. If not, bidirectional communications can be established to program the transceiver device with a unique communication code over an inductive link. Typically, the communication code is a sequence of bits identifying a relationship between two or more transceivers for exclusive communications.

A communication code can be a unique identifier that is transmitted in messages between transceivers so that the recipient can identify a source of the message. If a received message includes an unexpected or unknown communication code, the message can be ignored.

An activation protocol such as orientation or position of a transceiver can cause one or multiple transceivers to be initialized with a communication code. For example, to initialize a pair of transceivers with a code, the transceiver devices can be moved in close proximity to each other. Proximity of a transceiver can be detected by sensing the strength of a received signal or orientation of an inductive field.

Following detection of a predetermined activating condition, a communication code can be generated and assigned for future use by the transceivers. As mentioned, the transceivers can maintain an exclusive communication relationship based on use of the communication code.

In one application, a button is pressed indicating that a transceiver device is to be initialized with a code. If a predetermined sequence of events such as proper orientation or proximity of the transceiver device is detected within a time window, an initialization process to program a code is initiated.

Another method to initiate the initialization process of establishing a communication code includes detecting a paging message. For example, a paging message received from a transceiver device can indicate a desire by a user to establish a communication code. A paging message can also indicate a desire by a user to establish an exclusive communication link using the programmed code.

A paging message can include a data field including the communication code so that a transceiver receiving the message can determine whether communications have been established with the transceiver device in the past. If the communication code received at a transceiver is a value unbeknownst to a monitoring transceiver device, a new communication code for communicating can be established. On the other hand, if the paging message includes a code recognized by the receiving transceiver device, a communication link can be established based on the code.

Using the communication code, a transceiver can determine the type of transceiver device and its functionality. For example, the code can identify whether a newly linking transceiver device is a mouse or a keyboard device.

As discussed, the initialization process to establish a code can be initiated at least in part by sensing a predetermined condition caused by a user. For example, a user can press a button on a transceiver device to activate an initialization process. Also, the user can move a transceiver device closer in proximity than is required for normal communications to initiate the initialization process. In general, a proximity of a transceiver device can be sensed based on the strength of a received signal. If the received signal is above a threshold value, it can be determined that the transceiver device is so close in proximity that such a condition is an indication that a user desires to program a transceiver with communication code.

An orientation of the transceiver device can be detected based on an axis of a received inductive field to determine whether a user desires to initiate programming of a communication code. Proximity of a transceiver device as well as orientation can be monitored to determine that a transceiver device should be initialized.

After programming, a communication code can be stored to support future exclusive communications. More specifically, a base transceiver and remote transceiver can both store a communication code in non-volatile memory. A transceiver can store different communication codes for each of multiple transceiver devices with which it can communicate.

When creating a new link, each device can determine based on use of a communication code whether the devices have communicated with each other in the past. If so, the initialization process of programming a communication code can be skipped and the transceivers can communicate almost immediately using a code.

A communication code can be derived at least in part based on a randomly generated number. Thus, two different random transceivers are unlikely to be programmed with the same code. In a multi-point communication system, all or a portion of bits in the communication code can be common to multiple transceiver, thereby enabling multiple transceivers to communicate using a single, shared communication code. Use of such a code can be advantageous when a transceiver broadcasts to multiple transceivers simultaneously.

As discussed, a portion of the code can identify a type of communication device to which the transceiver is coupled. In this way, a communication code is unique yet it also includes information identifying a type of transceiver. A format of data to be transmitted between devices can be determined based on a code.

In one instance, a base transceiver device is used in a cellular phone and a remote transceiver device is used in to a headset including a speaker and a microphone. Based on use of a communication code and bidirectional communications between the transceiver devices, a user can communicate over an exclusive inductive link between the cell phone and headset. A user wearing the headset can therefore communicate with a remote party through a phone link supported by the cell phone. The transceiver devices can include multiple transducers so that continuous communication between the headset and cell phone can be maintained regardless of the orientation and position of the transceiver devices.

Another aspect of the present invention is directed towards a system and method supporting inductive communications among multiple transceivers in a multi-point communication system. In an illustrative embodiment, bidirectional communications are supported between pairs of transceivers selected from at least three transceivers. Each pair of communicating transceivers can be assigned one or more time slots in which to communicate. At least one transceiver can include multiple transducer elements that are selectively activated to support communications between the transceivers regardless of their orientation relative to each other. A transceiver can be incorporated in many types of devices including computer equipment, games, mobile phones, Personal Digital Assistants (PDA), or headsets.

A comparator can be used to compare link qualities of communications of different transmit-receive transducer elements of the pairs of transceivers communicating with each other. Based on detected link quality, a controller can select which of multiple potential transmit-receive transducer elements of a transceiver pair will be used to support further communications. Consequently, multiple transceivers can communicate with each other over selected transducer elements.

In one application, at least one pair of transceivers includes multiple transducers to support communication at any angular orientation. For example, a first transceiver including three orthogonal transducers can communicate with a second transceiver including at least one transducer. Each combination of transmit-receive pairs of transducers between the transceivers can be compared to determine which provides an acceptable link quality. As mentioned, a controller can select which set of transducers between a pair of transceivers is used to support future communications based on detected link quality. A set of transceivers can include a transducer in each transceiver, multiple transducers in one transceiver and a single transducer in another transceiver, or multiple transducers in each transceiver.

During operation, a signal can be transmitted from one transceiver to multiple transceivers. Each of multiple transceivers can simultaneously receive the transmitted signal to determine link quality for a potential future link between transceivers. Since multiple transceivers detect link quality simultaneously, less bandwidth is necessary to determine signal quality of multiple links than when the process is performed individually for each transceiver at different times.

Link qualities can be determined by comparing which of multiple transducer elements in a transceiver device produces a strongest signal in a receiving transceiver. A message can be sent from the receiving transceiver indicating which of multiple transducer elements in a transmitting device produces a strongest signal. Typically, the strongest signal is determined based on which transducer element receives the largest amplitude of a received signal such as a voltage signal corresponding to strength of a received inductive field. Link qualities can also be determined by comparing which of multiple transducer elements in a receiving device produces a strongest signal from a transmitting transceiver.

In one application, link quality can be determined by identifying how many bits in transmitted signal are properly received at a transceiver.

A set of multiple transceivers in a communication system can include a base transceiver and at least two remote transceivers with which the base transceiver communicates. The base transceiver can include multiple orthogonal transducers and each of the remote transceivers can include as few as a single transducer. Based on this topology, each transceiver can be positioned at any angular orientation relative to the others, yet communication can be continuously maintained via a selected pair of transmit-receive transducers in each base-remote transceiver pair. Communications also can be supported by activating more than two transducers to transmit or receive an inductive field.

Each of multiple remote transceivers communicating with a base transceiver can include multiple orthogonal transducer elements, while the base transceiver includes one transducer element. One of the multiple transducers in a remote transceiver can be selected to transmit and receive messages from the base transceiver including only one transducer.

As previously discussed, wireless bandwidth can be shared among the multiple transceivers without interfering with each other using time slots and, optionally, communication codes. At least a portion of the wireless bandwidth can be allocated for receiving paging signals from other transceiver devices trying to establish a communication link. Consequently, paging transceivers can share a wireless bandwidth with other transceivers already communicating with each other.

As mentioned, a group of transceivers communicating with each other can utilize communication codes to support exclusive communications. A new transceiver not yet initialized with a communication code can initiate a programming routine in which a communication code is assigned for communications. To establish a new communication code or relationship between transceiver devices, a transceiver can send paging signals to a base transceiver that, in response to an activation sequence, generates a unique communication code for bidirectional communications. Typically, a communication code is transmitted in each message so that a receiving transceiver can identify that the message is generated from a particular device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 9A and 9B are state diagrams illustrating transceiver modes according to certain principles of the present invention.

DETAILED DESCRIPTION OF THE INVENTION

A description of preferred embodiments of the invention follows.

Figure 1:
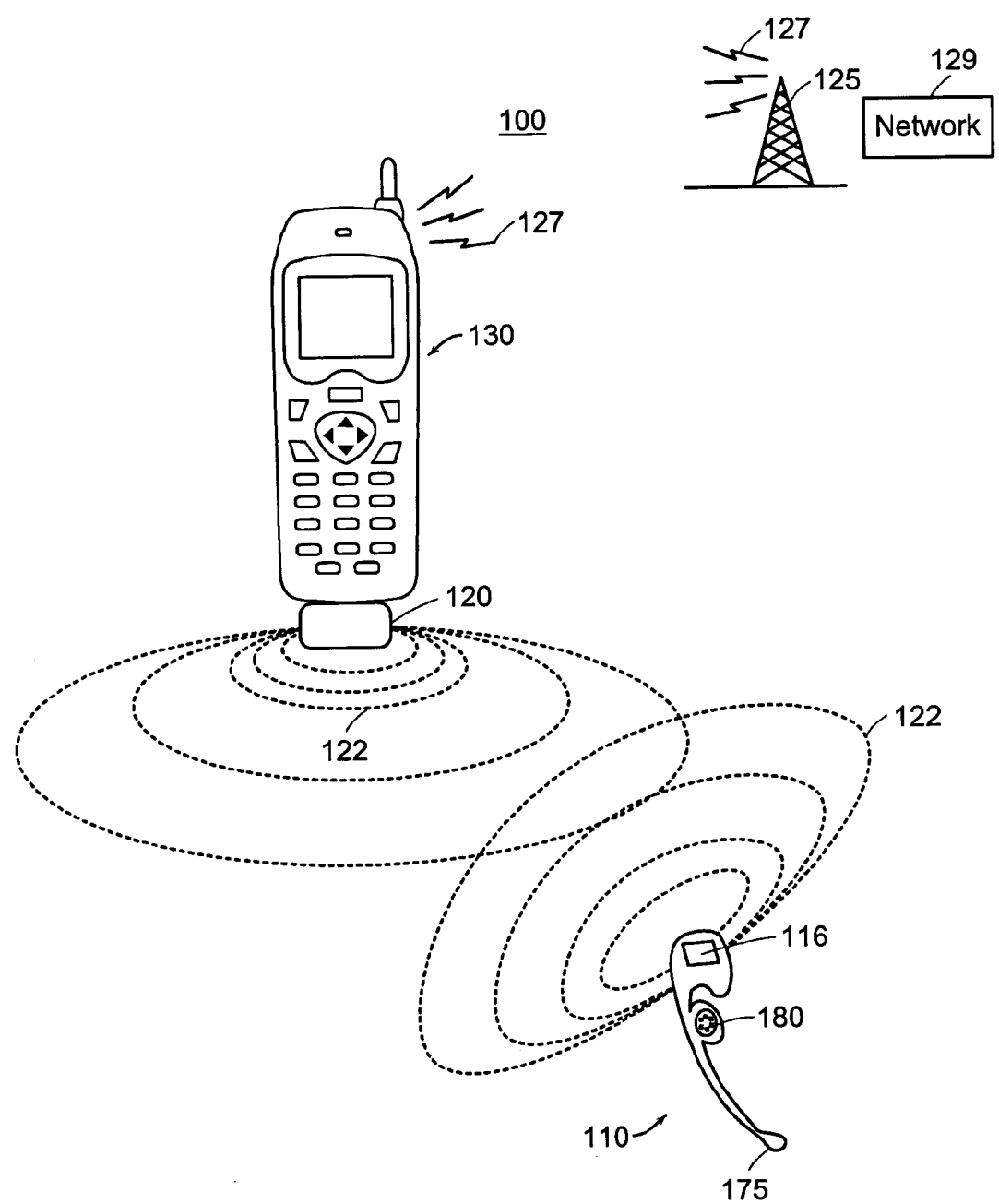
FIG. 1 is a pictorial diagram of a wireless communication system according to certain principles of the present invention.

FIG. 1 is a pictorial diagram of a wireless communication system according to certain principles of the present invention. As shown, wireless communication system 100 includes cellular phone device 130 and headset 110. Generally, headset 110 is worn by a user to communicate with a remote party over one or multiple wireless links. For example, inductive link 122 supports communications between a user wearing headset 110 and cell phone 130. Radio Frequency (RF) link 127 supports communications between cell phone 130 and cellular base station 125. Base station 125 is coupled to network 129 such as a PSTN (Public Switching Telephone Network).

Instead of holding cell phone 130 to one=s ear as is ordinarily done to communicate over a telephone with a remote party, a user wearing headset 110 can communicate with the party using headset 110. For example, a user can speak into microphone 112 to convey a voice signal to a remote party through inductive link 122 and RF link 127. In a reverse direction, voice signals generated by a remote user at the other end of phone 130 are conveyed through RF link 127 and inactive link 122 to headset 110. The voice signal received at headset 110 are generated over speaker 180.

Speech generated by a user is detected by microphone 112 and modulated onto an inductive carrier frequency of inductive link 122. The inductive signal including voice information transmitted from headset 110 is received and demodulated at base transceiver 120. Base transceiver 120 converts the voice signal into a protocol accepted by cell phone device 130. Cell phone 130 receiving the voice signal transmits it over wireless link 127 using standard techniques such as those based on use of CDMA (Code Division Multiple Access) technology.

In a reverse direction, signals generated by the remote party at the other end of phone 130 are communicated through base station 125. The signals are formatted for transmission over radio link 127 to cell phone 130 using standard protocols. The signal received at phone 130 is then reformatted into an appropriate protocol for reception at base transceiver 120 that processes the signal and re-generates the information over inductive link 122 to headset 110. Accordingly, a sound output that is otherwise generated at cell phone 130 is instead generated at speaker 180 for a user wearing headset 110.

While wearing headset 110, a user can communicate hands-free without otherwise being entangled in wires connecting cell phone 130 and headset 110. According to one aspect of the present invention, inductive coupling techniques are used to minimize the size and therefore the burden of wearing or using headset 110.

In one application, headset 110 communicates with base transceiver 120 up to several meters away. Thus, cell phone 130 can be held at a distance from user or, at a minimum, away from the user=s head.

Although communication system 100 is directed towards a wireless headset device, it should be noted that a combination of base transceiver 120 and remote transceiver 116 can be used in other wireless applications as well. For example, base transceiver 120 can be coupled to a wired-telephone device so that a user can communicate hands-free while wearing headset 110 in an office setting or the like. Additionally, the transceivers can be used in other short range applications where the use of inductive technology for wireless voice or data transmissions is appropriate.

Base transceiver 120 can include electronic components housed in a rigid body made from plastic or other durable material. In one application, base transceiver 120 is removably attached to cell phone 130. Alternatively, base transceiver 120 is coupled to cell phone 120 using a cable wire through a 2.5 mm jack or other suitable phone connector. In yet another application, base transceiver 120 is integrated into cell phone 130 so that it does not protrude from the end of cell phone 130.

While in an operational state, communication system 100 can utilize TDD (Time Division Duplexed) techniques to communicate. More specifically, a usable bandwidth at a chosen carrier frequency such as 12 MHz can be partitioned into time slots shared by two or more communicating transceivers. An advantage of using inductive technology is the reduced interference among multiple users that share use of a common carrier frequency. Typically, inductive communication signals are very difficult to detect at distance greater than several meters away, so the effects of an inductive field generated by one remote user can be negligible to another remote user. However, techniques discussed in this specification can be used to reduce interference with users within close range of each other.

Figure 2:
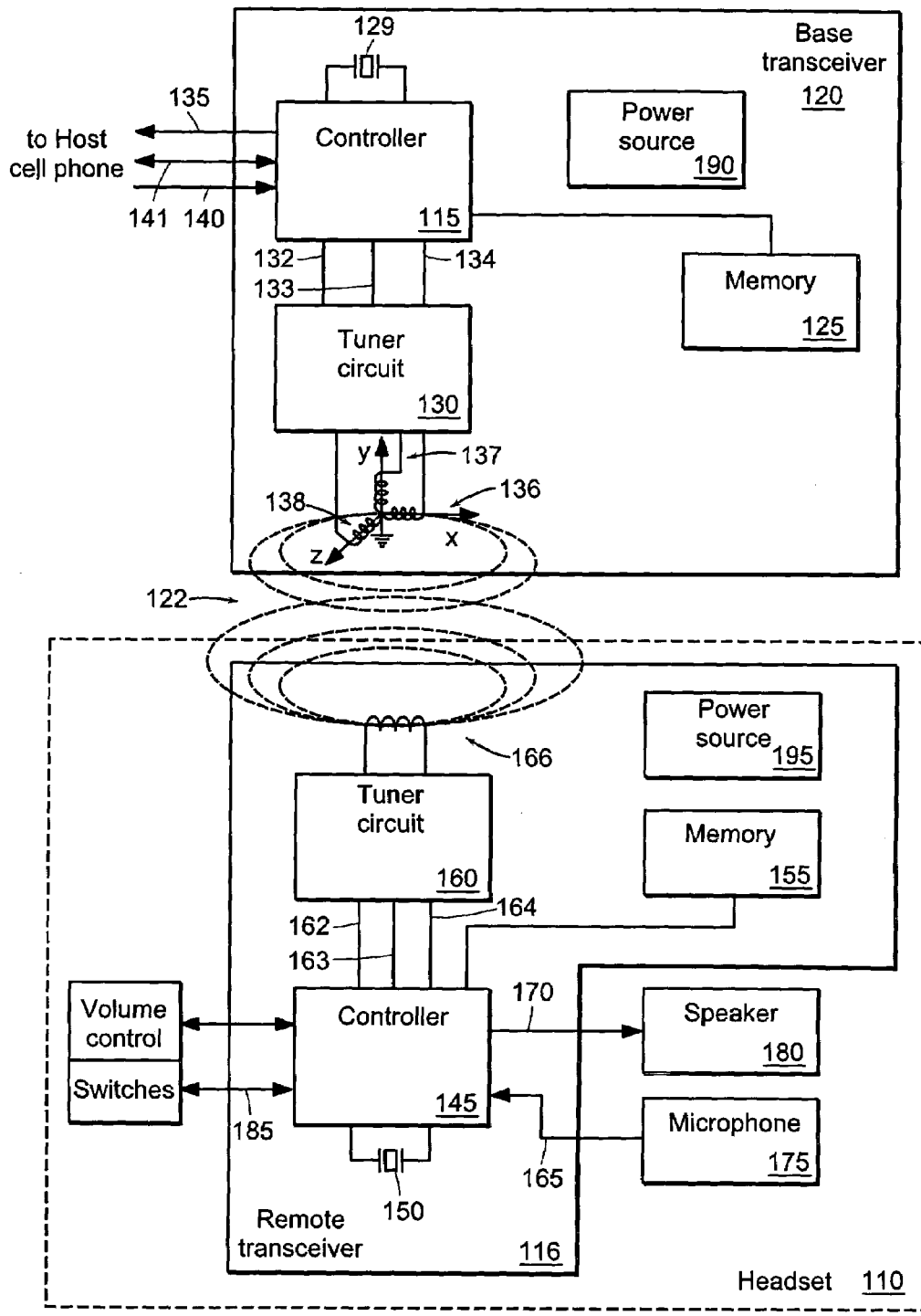
FIG. 2 is a block diagram of transceiver devices and corresponding circuit components according to certain principles of the present invention.

FIG. 2 is a block diagram illustrating electronic circuitry supporting inductive communications according to certain principles of the present invention. As shown, base transceiver 120 can include three orthogonally disposed transducer elements, each of which can be dynamically tuned for transmitting and receiving information over inductive link 122. Remote transceiver 116 can include a single transducer element 166 for transmitting and receiving information over inductive link 122. Based on this topology, base transceiver 120 and remote transceiver 116 can maintain continuous communication regardless of their orientation relative to each other.

Although base transceiver 120 is shown including three transducer elements, namely, x-transducer 136, y-transducer 137 and z-transducer 138, the number of transducers used in an application can vary. For example, base transceiver 120 can include as few as only a single transducer or as many transducers that fit in a transceiver device. Similarly, remote transceiver 116 can include any number of transducers such as three orthogonal transducers to support bidirectional communications with base transceiver 120.

Typically, an appropriate number of transducers are employed in each transceiver device so that base transceiver 120 and remote transceiver 116 can communicate with each other regardless of their orientation or position using inductive fields. In certain applications, fewer transducers are necessary in a transceiver because it is known that certain orientations of the transceivers relative to each other are not possible or alternative transducer configurations produce the required magnetic field for communication.

Either transceiver device can be fixed so that its orientation does not vary with respect to a complementary transceiver. However, in the application as mentioned in FIG. 1, an orientation of either transceiver device can vary. For example, a user carrying phone 130 in his pocket while walking can enjoy continuous connectivity with phone 130 over headset 110. In this case, both transceiver devices are subject to random orientation and position.

As shown in FIG. 2, base transceiver 120 can include controller 115 such as an ASIC (Application Specific Integrated Circuit), which is electrically connected to tuner circuit 130 via transmit lines 132, receiver lines 133, and switch control lines 134. Tuner circuit 130 is connected to a set of three orthogonal transducers, including x-transducer 136, y-transducer 137, and z-transducer 138. In general, tuner circuit 130 can select a transducer element and adjust its characteristics for transmitting and receiving inductive signals.

Base transceiver 120 can be also electrically and logically connected to base crystal 129, memory 125 such as EEPROM, audio line 135, audio/data line in 140, control/status line 141, and power source 190.

Remote transceiver 116 can include controller 145, which is electrically connected to tuner circuit 160 via remote lines 162, receive lines 163, and switch control lines 164. Remote transceiver 110 can also include remote crystal 150 frequency source, memory 155 such as EEPROM, audio/data line out 170, audio/data line in 165, and volume control line 185. In a voice application as mentioned, headset 110 includes microphone 175 and speaker 180. Power source 195 can be used to power circuitry in remote transceiver 116.

In one application, controller 115 and controller 145 utilize Time Division Duplexing (TDD) and Gaussian Minimum Shift Keying (GMSK) to transmit and receive data information.

If used, custom designed CMOS (Complementary Metal Oxide Semiconductor) chips support full duplex transmission of audio and data. Other circuit technologies can be used but may not necessarily provide the low power and design advantages that CMOS semiconductor chips provide.

Typically, crystal 129 and crystal 150 are 9.8 MHz frequency sources. Other suitable crystals can be used depending on the application.

Memory 125 and memory 155 can be EEPROM (Electrically Erasable Programmable Read Only Memory). Each memory device can include grounding pins that identify the "personality" of a transceiver device (e.g., a mouse, a keyboard, or gaming joystick, Personal Digital Assistant, stereo, global positioning system, radio, MP3 player). Accordingly, the grounding pins can be used to select specific software functions for use in a particular transceiver device.

X-transducer 136, y-transducer 137, z-transducer 138, and single transducer 166 can be transducer coils having a ferrite core. Microphone 175 can be a miniature microphone such as Panasonic part number WM 66DC103. Typically, power source 190 and power source 195 are rechargeable button cells such as NiMH 40 mA Hr units.

In a phone application as discussed in FIG. 1, controller 115 receives audio or data information via input audio/data line 140, converts the received information from analog to digital for processing (if it is analog audio), and drives the information to impedance tuning circuit 130 that drives x-transducer 136, base y-transducer 137, and base z-transducer 138 for transmission. The transducers generate a magnetic induction field 122, such that remote headset unit 110 receives the transmitted signals. Transmitted signals on inductive field 122 are received by remote unit transducer 166. The signals are sent to controller 145 and are converted to a digital protocol for processing. Raw digital data is then converted to an analog signal to drive speaker 180. The process may also be reversed such that remote headset unit 110 sends signals to base transceiver 120.

Logic within controller 115 and controller 145 controls base and remote switch lines 134 and 164 in order to operate tuner circuits 130 and 160 that are used to adjust characteristics of the transducers. Base and remote transmit lines 132 and 162, and base and remote receive lines 133 and 163 assist in operating base unit 105 and remote unit 110 in either transmit or receive mode. Base and remote transmit lines 132 and 162 support the operation of base unit 105 and remote unit 110 at maximum power and low impedance for transmitting; while base and remote receive lines 133 and 163 support a parallel tuned network for receiving.

In one application, power source 190 and power source 195 are battery devices. In other applications, base power source 190 and second power source 195 can be supplied through an automobile cigarette lighter, or may be directly supplied via wall current.

Base and remote control/status lines 141 and 185, can be used to "wake up" the devices from a very low power operating mode. In another example, base and remote control/status lines 141 and 185 can be used to instruct controller 115 and controller 145 to "page" the other device to "wake up" a link. Instructions for controlling these communications can be stored in memory 125 and 155.

Figure 3:
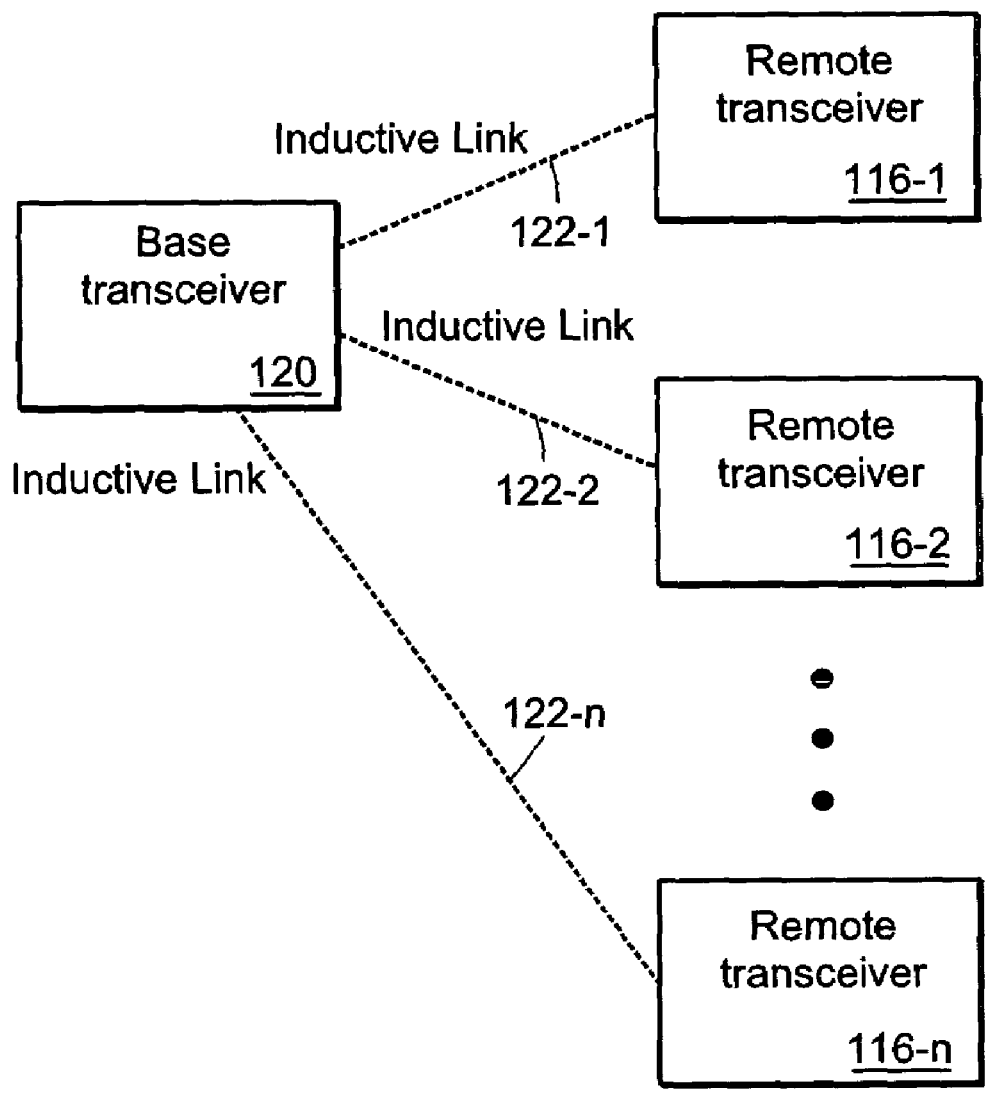
FIG. 3 is a block diagram of a hub topology in which a base transceiver communicates with multiple remote transceiver devices according to certain principles of the present invention.
Figure 14:
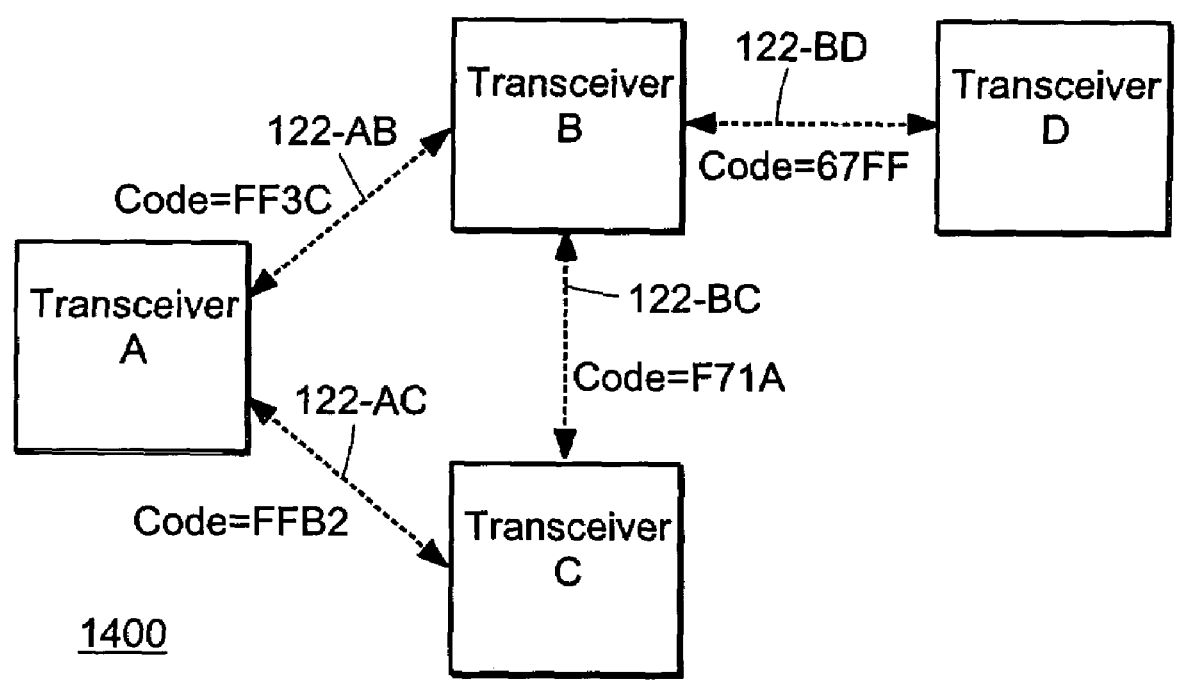
FIG. 14 is a block diagram illustrating how multiple transceiver devices can communicate with each other over a shared inductive bandwidth according to certain principles of the present invention.
Figure 15:
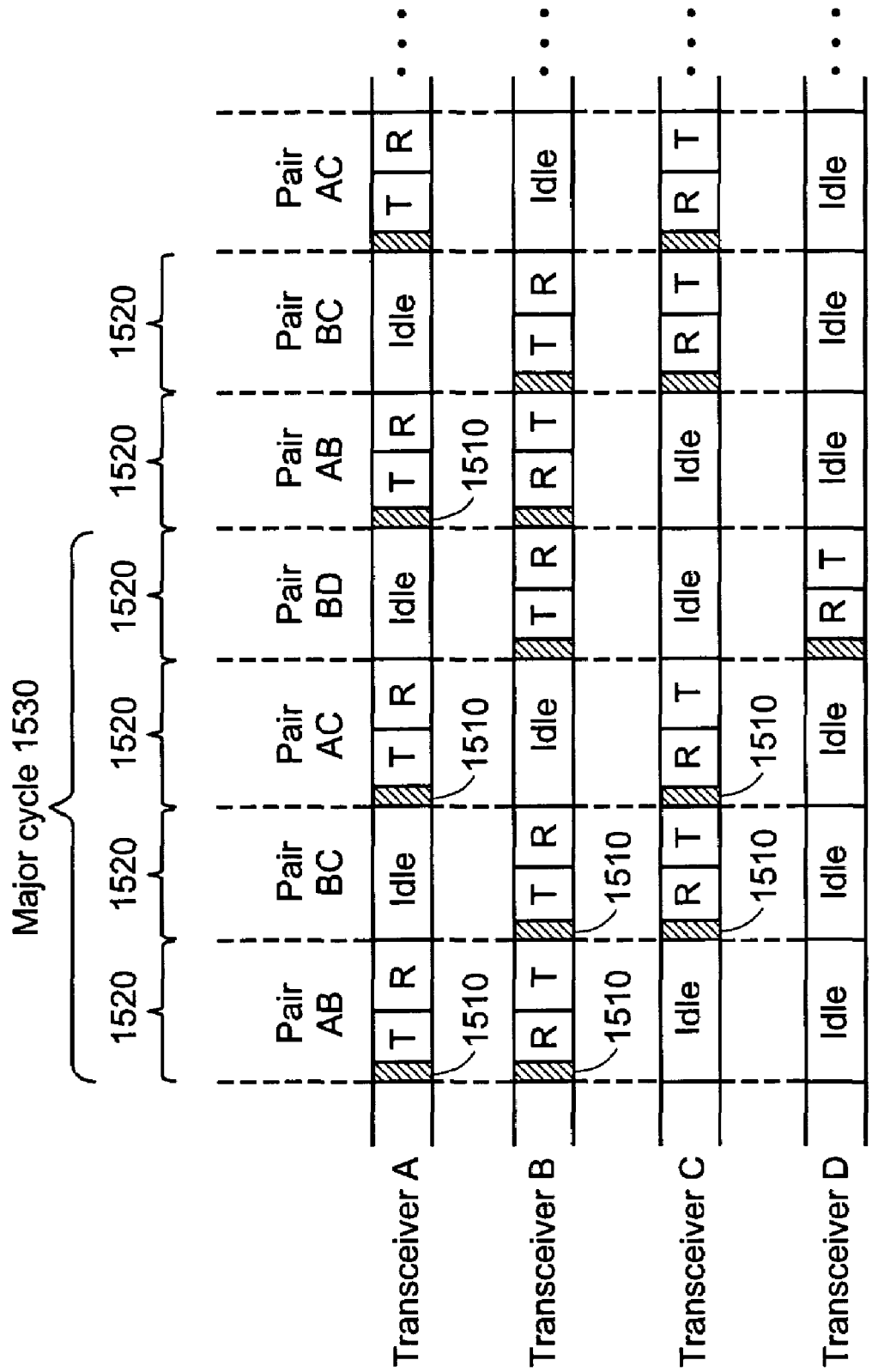
FIG. 15 is a timing diagram illustrating time slot assignment of multiple pairs of communicating transceiver devices according to certain principles of the present invention.
Figure 16:
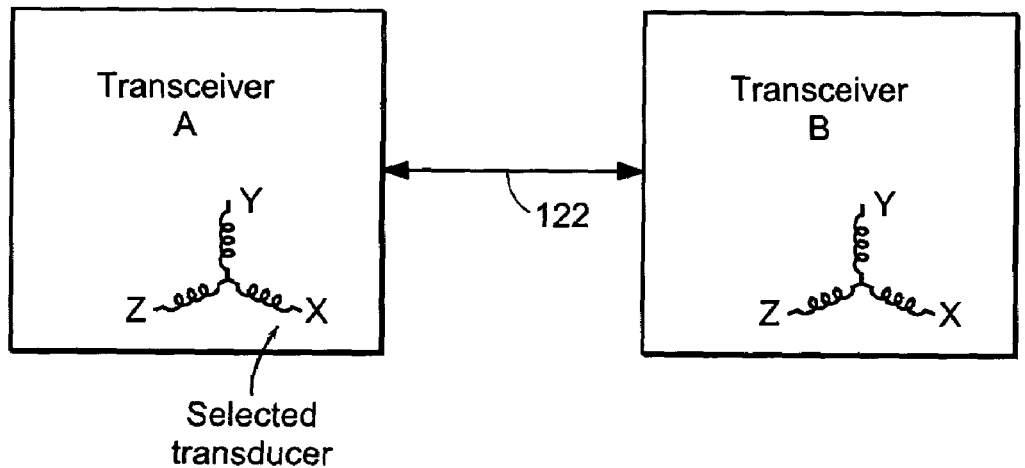
FIG. 16 is a block diagram of multiple transceivers and corresponding transducer elements according to certain principles of the present invention.
Figure 17:
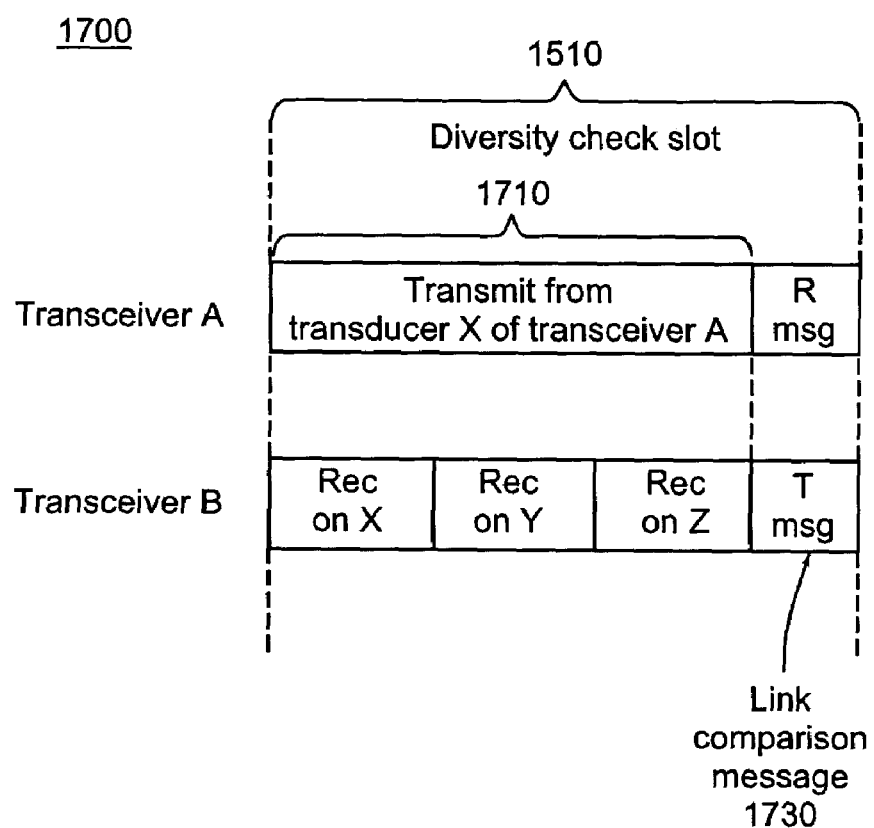
FIG. 17 is a block diagram illustrating a method of implementing diversity checks according to certain principles of the present invention.

FIG. 3 is a block diagram of a point-to-multi-point inductive communication system according to certain principles of the present invention. As shown, base transceiver 120 can maintain communication with one or multiple remote transceivers 116-1, 116-2 . . . 116-*n* over respective inductive links 122-1, 122-2, . . . 122-*n*. As discussed, each transceiver can include as few as a single transducer element or multiple orthogonal transducer elements. Briefly, FIG. 14 is a block diagram of yet another topology in which multiple transceivers communicate with each other. This will be discussed in more detail later in this specification.

Figure 4:
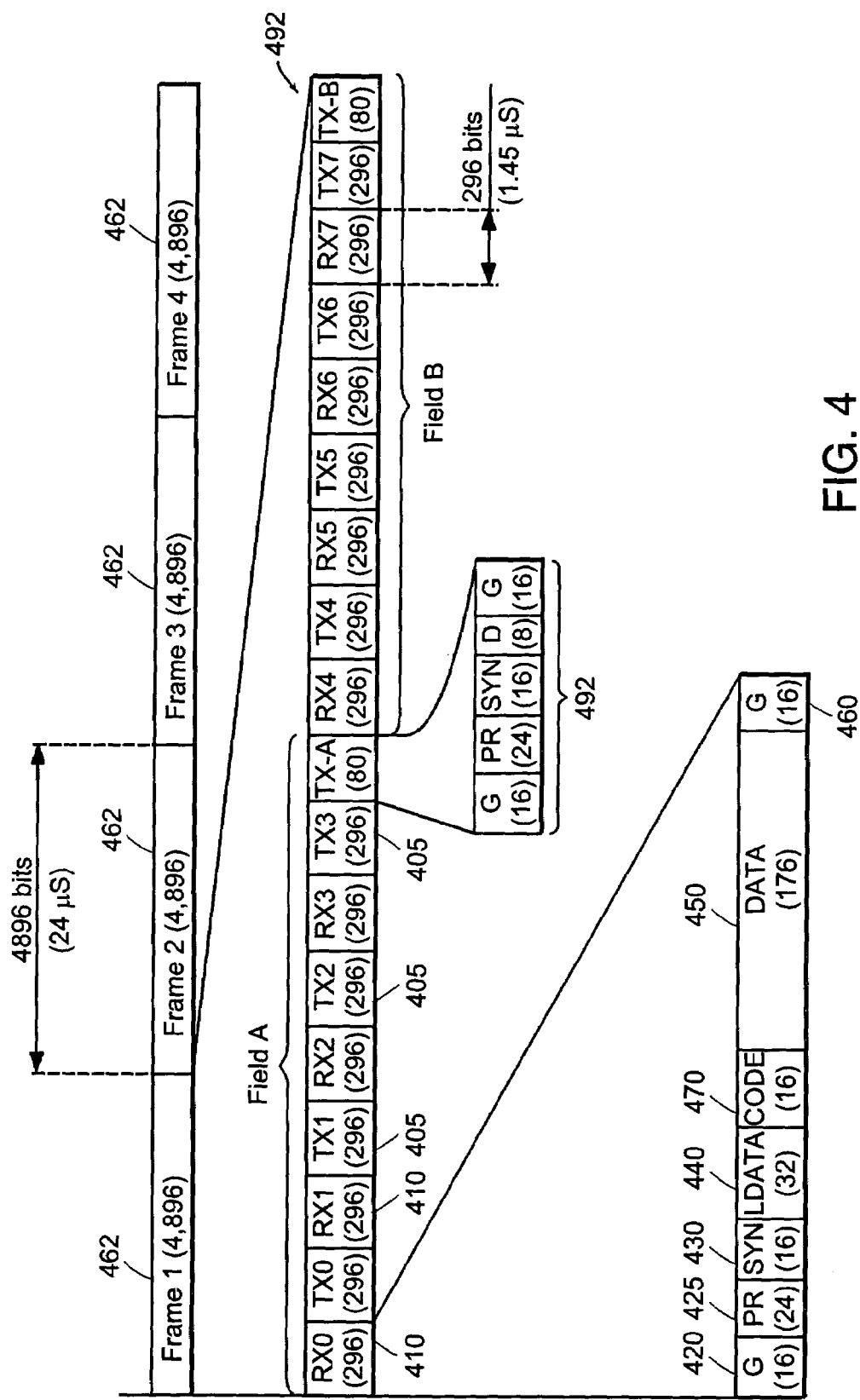
FIG. 4 is a timing diagram illustrating a bandwidth partitioned into time slots according to certain principles of the present invention.

FIG. 4 is a timing diagram of a time-slotted inductive communication system according to certain principles of the present invention. Each frame 462 includes field A and field B for transmitting and receiving data in respective time slots or data fields. Although diagram 400 depicts an approximate ratio of 50% transmitting to 50% receiving between transceivers, apportionment of a bandwidth and use of particular data fields can vary depending on the application.

Both field A and field B are broken down into four transmit time slots 405 and four receive time slots 410 that alternate in a time sequence. An additional time slot can be used for link management. For example, a time slot such as diversity slot 492 in field A and B can be allocated for diversity checks, which are noted as TX-A and TX-B.

A diversity check is used to test whether other uniquely oriented transducer devices support more efficient communications. More specifically, a diversity time slot 492 can be used by base transceiver 120 or remote transceiver 116 to monitor a quality of a received signal transmitted on a different transducer axis. If one transducer coil provides better coupling, e.g., greater detected signal strength at a receiver, future bit information can be transmitted or received on that transducer coil.

It should be noted that there are a number of ways to implement diversity checks. For example, in one application, a transceiver device can potentially include three orthogonal transducers, namely, x-transducer 136, y-transducer 137 and z-transducer 138. Each of the three axes of the individual transducers can be tested to determine whether a link between a single transducer and either x, y or z is more optimal. More specifically, a signal can be transmitted to transducers x, y and z. It can be determined which of the three axes is optimal for transmitting based on a comparison of which transducer receives a strongest received signal. This is one possible method of performing a diversity check.

Additional axes can be tested in addition to those of each transducer device x, y and z. For example, multiple transducers can be simultaneously selected to transmit or receive an inductive field. Thus, combinations of additional axes produced by simultaneously activating transducers x-y, transducers y-z, and transducers x-z can be tested using additional diversity checks. Also, all three transducers can be activated simultaneously to produce yet another axis on which to perform a diversity check.

A preferred combination of transceivers can be calculated based upon results from the individually energized transducers. For example, if equal signal strength is received on all three transducers during diversity checks, it can be assumed that the preferred axis can be achieved by selecting all three transducers to transmit or receive an inductive field.

It should be noted that FIG. 4 is a timing diagram with respect to a first transceiver. A complementary timing diagram for the another transceiver communicating with the first transceiver would have opposite time slots for receiving and transmitting data information in data fields 405 and 410. In other words, while one transceiver transmits, another transceiver receives.

Using an appropriate carrier frequency of 13.56 MHz, 296 data bits of information can be transmitted or received in a time slot or 4,896 bits (24 milliseconds) can be transmitted in frame 462.

Each transmit time slot 405 and receive time slot 410 can be used to transmit or receive 296 bits of information. A majority of the 296 bits in each slot can be used to transmit or receive data information. The other bits in a time slot can be used for command, control, or error correction/detection.

Guard bits 420 (16 bits) and 460 generally serve as a buffer zone between time slots. Typically, use of guard bits 420 allows transients as a result of transmissions in a last slot to diminish before data processing begins on data transmitted in a new time slot.

Preamble bits 425 (24 bits) can be a predetermined bit sequence of alternating ones and zeros. This sequence of bits can be used to adjust timing and synchronize transceivers.

Synchronization bits 430 (16 bits) can be a coded sequence of predetermined random bits that are used to synchronize a receiver with a transmitting transceiver and indicate start of data. When the received sequence of bits match the sequence in the receiving transceiver, the devices are synchronized with respect to the start of further transmissions.

An FEC (Forward Error Correction) code is optionally included in a time slot to ensure that bit information is properly received in a time slot.

LDATA bits 440 are generally used to maintain a link by controlling gain, transmission power, frequency channel management, diversity, device unique identifier or communication codes. These bits can be command bits that identify a specific command to be executed by a remote transceiver device. For example, a change in the remote unit transmitter power level can be controlled via a command. In the case of a change in the remote unit's transmitter power, these bits would specify the level.

A list of commands that can be sent between transceivers includes commands for: controlling gain of signals, changing transmit power level, selecting transducers, selecting magnetic field direction, changing communication codes, requesting bandwidth changes, changing bandwidth allocation among multiple devices, changing the length of transmit and receive time slots, changing communication frequency, allocating communication time slots among multiple devices, and changing operating parameters of controller 130 and controller 145.

Commands can also be used to control one transceiver remotely from another transceiver. In one embodiment, volume control buttons of phone 130 may be used to control volume of speaker 180 in headset 110 by transmitting commands in slot 440. Similarly, one transceiver may be powered off by another transceiver on remaining battery power in transceiver may be monitored by a display in another transceiver. Thus headset 110 can be made "switchless" so that all functions, such as volume control and operating power level are controlled by phone 130. Functionality of a "switchless" headset can be further enhanced if field orientation and field strength are also used to control the functions of the headset.

In one embodiment, LDATA bits 440 are subdivided as follows: an FEC (Forward Error Correction) code of 6 bits to ensure that bit information is correctly received in a time slot; a slot ID of 2 bits which identifies which of the four transmit/received pairs in a frame is currently being transmitted; a command name of 8 bits that identifies the specific command being transmitted between transceivers; and command data of 16 bits that contains data specific to the command. Use of a slot ID can be advantageous since it enables the slots to be randomized within the frame and then sorted into proper order at the receiving unit, thereby minimizing the impact on audio quality of missing or corrupted data.

The LDATA command name and command data may also include the exclusive communication code as an alternative embodiment of a dedicated communication code 470. In this alternative embodiment, the communication code is transmitted in slots whenever commands are not required, and thus the communication code would fill otherwise "empty" command and data bits. This is advantageous in that it requires less bandwidth whereas a separate bit allocation 470 ensures that every slot has the communication code.

Communication code 470 can be a 16-bit code that uniquely mates a base transceiver and one or more other transceiver devices. This code can be an at least partially random code that is passed from base transceiver 120 to remote transceiver 116 upon initialization. Code 470 can also be programmed during manufacturing. If a code received in this data field is not recognized by a receiving transceiver device, following data information can be ignored. Consequently, communication code 470 can be used to support exclusive communications with one or multiple other transceiver devices.

In one embodiment, a 16-bit code includes a 10-bit random number that is unique to all devices in a multi-point communication system, a 3-bit number unique to each transceiver device in a multipoint system (optionally set to a null value when broadcasting to all transceiver in a multi-point system), and a 3-bit unique to a type of device. In another application, the code can be a 16-bit value for each exclusive device and thus a unique code is stored for each device.

Each transmit time slot 410 and receive time slot 405 can include a field 450 that is used to transmit or receive payload data. These bits can include CVSD encoded audio data. Since one side of the system transmits only half the time, enough data must be in this 192 bit interval so that the user will not perceive an interruption in the audio.

As mentioned, diversity check slot 492 enables the base unit to assess whether the current transducer selected for transmitting and receiving is acceptable. Generally, base transceiver 120 monitors the received signal quality on a different transducer axis. Based on a link quality, such as received power, received noise, or bit error rate, a transceiver can determine whether to continue using a current transducer to transmit or receive or to switch to use of another transducer.

Figure 5:
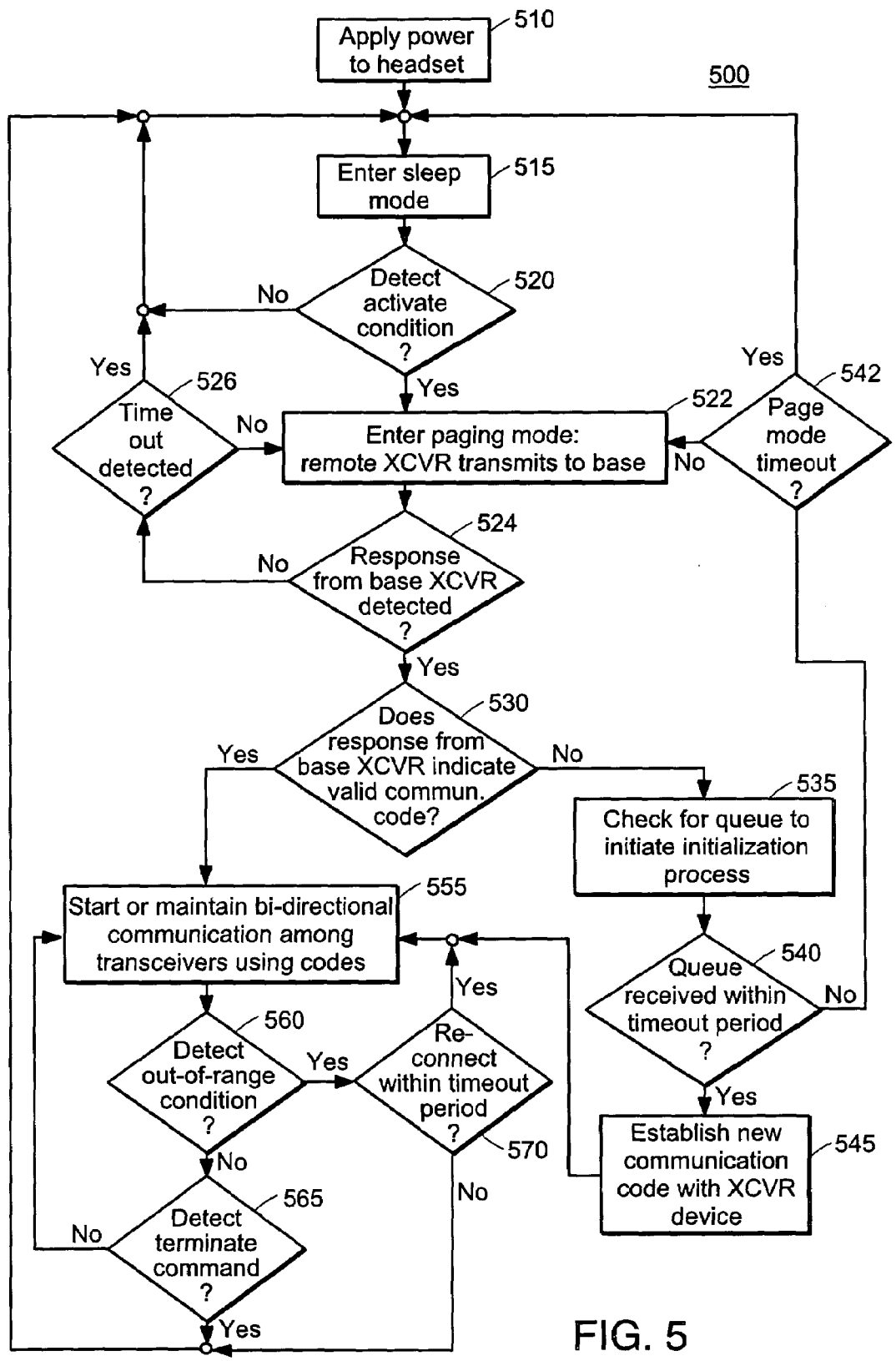
FIG. 5 is flow chart illustrating a method to establish communication and program a transceiver device with a communication code according to certain principles of the present invention.

FIG. 5 is a flowchart illustrating a method of communicating according to certain principles of the present invention. Generally, flowchart 500 is a technique for establishing an exclusive or at least partially exclusive relationship between multiple transceivers based on use of a communication code 470.

More specifically, base transceiver 120 can determine whether a message received from a remote transceiver 116 includes a valid communication code 470 indicating that the transceivers have been initialized for communications. Use of a communication code 470 ensures that data messages generated for an exclusive communication between base transceiver 120 and remote transceiver 116 are not accidentally or intentionally picked up by another user transmitting and receiving over the same carrier frequency. Thus, a phone call supported by headset 110 can be secure so that eavesdroppers do not listen in on a private call.

Flowchart 500 describes two methods to link a remote transceiver 116 to a base transceiver 120 for private bidirectional communications. If base transceiver 120 and remote transceiver 116 have not yet been initialized with each other, the transceivers can be initialized with a communication code 470. After a transceiver has been initialized or if the transceivers have already been initialized with a communication code 470, flowchart 500 illustrates a method of establishing bidirectional communications between transceivers.

In step 510, power is applied to headset 110. Headset 110 is moved within detectable range of base transceiver 120 in cell phone 130. This is typically less than 2 meters.

Depending on recent use, base transceiver 120 coupled to cell phone 130 can be set to a sleep mode to conserve battery power. While in the sleep mode, base transceiver 120 intermittently listens for paging signals from remote transceiver 116 coupled to headset 110.

After applying power to headset 110 in step 510, remote transceiver 116 enters a sleep mode in which remote transceiver 116 is dormant. Generally, minimal circuitry is powered to reduce power consumption, yet selected circuitry in headset 110 remains powered to enable the device to turn on quickly if an activation signal is received. For example, features of a transceiver can be shut down except the clock and microprocessor, which can run at a reduced duty cycle. At predetermined time intervals, each transceiver can "wake up" to check for an activation signal, such as user input or receipt of a paging signal from another device. If no activity is detected a transceiver remains in a low power or sleep mode.

In step 520, remote transceiver detects whether an activation condition has occurred. One such activation may be detection of throwing a switch or turning a volume control on headset 110. The activation signal can vary depending on the application.

If no activation signal is detected in step 520, remote transceiver 116 remains in the sleep mode. However, when an activation signal is detected in step 520, process flow continues at step 522, which causes the remote transceiver to enter a paging mode.

While in the paging mode, remote transceiver 116 of headset 110 transmits a repetitive stream of data information to base transceiver 120. A protocol for transmitting the data was previously discussed in FIG. 4. Generally, the remote transceiver 116 generates a data sequence and listens during interleaved time slots for acknowledgment messages from base transceiver 120.

A paging signal can include a unique sequence of bits so that a receiving transceiver can identify it as a paging signal. If a link is not established within a predetermined time frame, the system reverts to a power saving "low power" mode.

Figure 8:
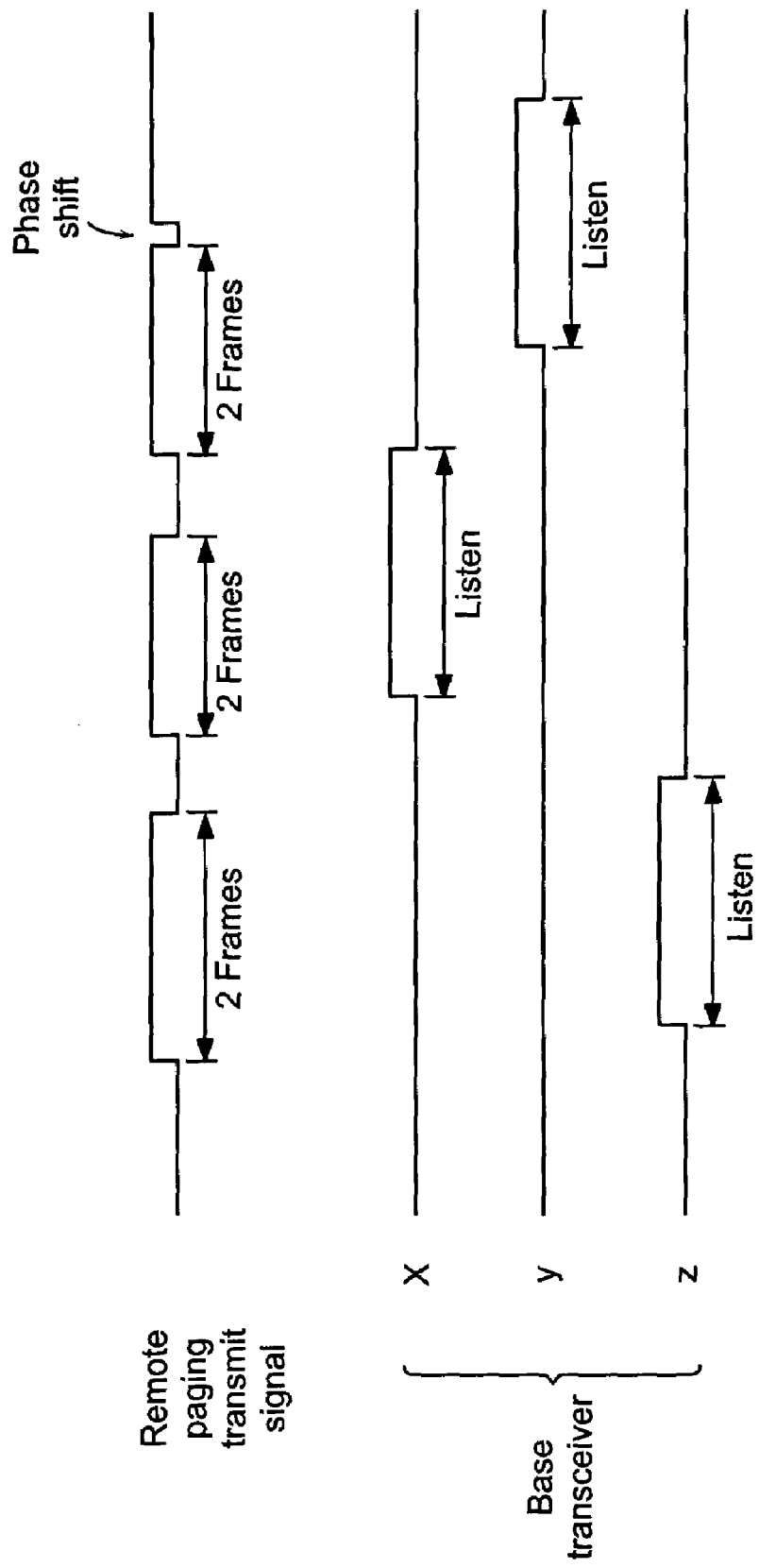
FIG. 8 is a timing diagram of a remote transceiver device paging a base transceiver to establish communications according to certain principles of the present invention.
Figure 10:
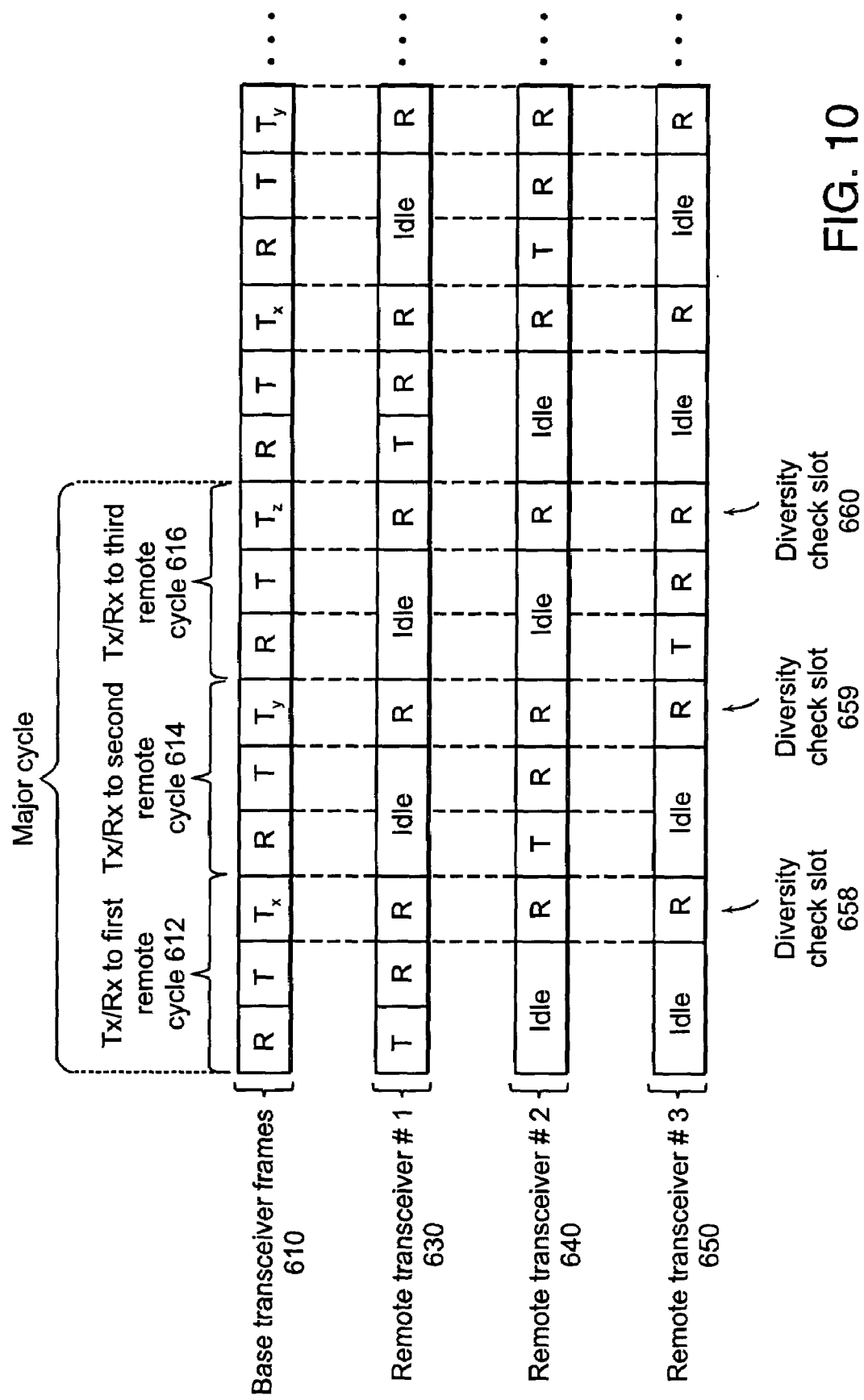
FIG. 10 is a timing diagram illustrating how multiple transceiver devices share bandwidth according to certain principles of the present invention.
Figure 11:
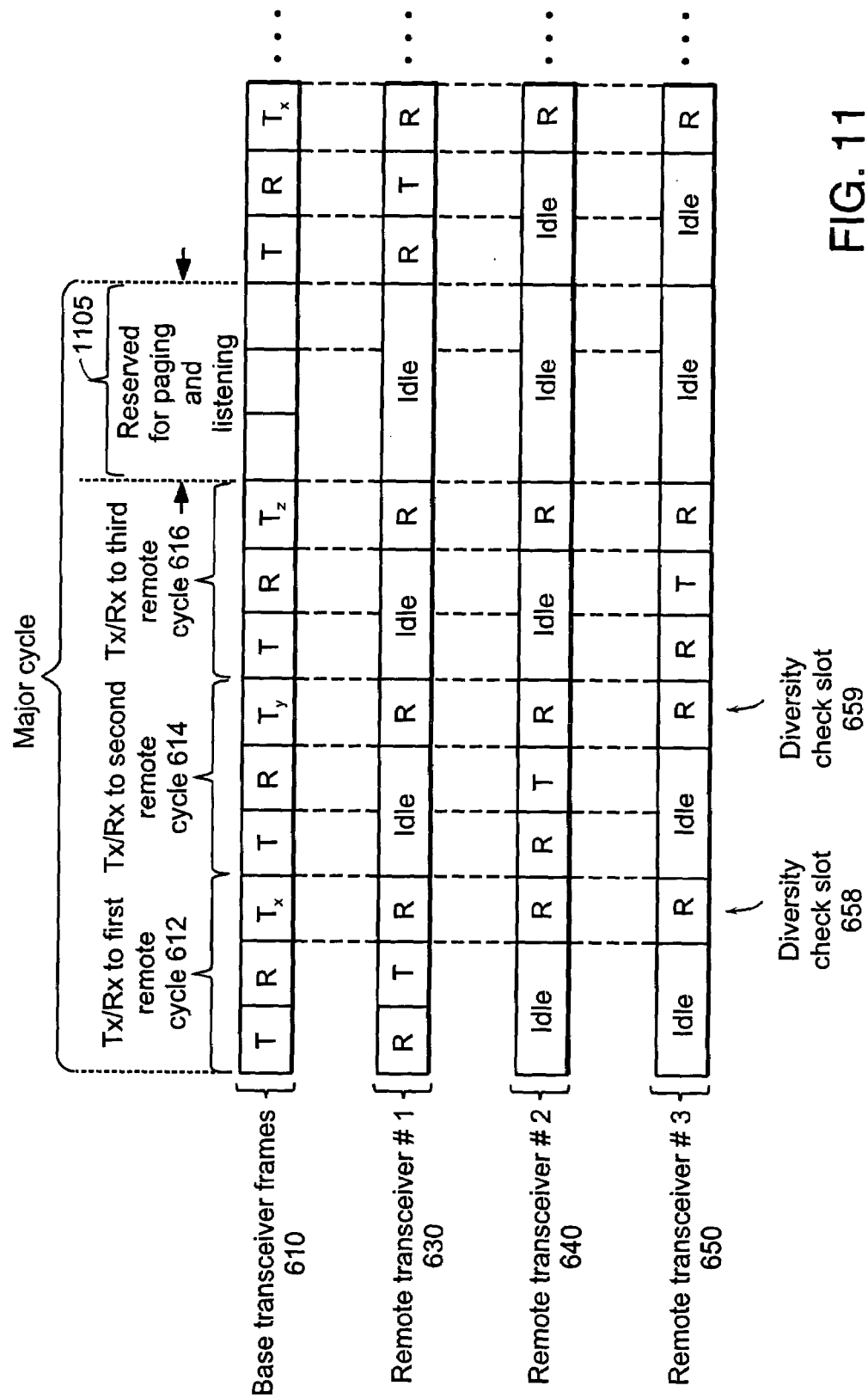
FIG. 11 is a timing diagram illustrating how multiple transceiver devices share bandwidth according to certain principles of the present invention.
Figure 12:
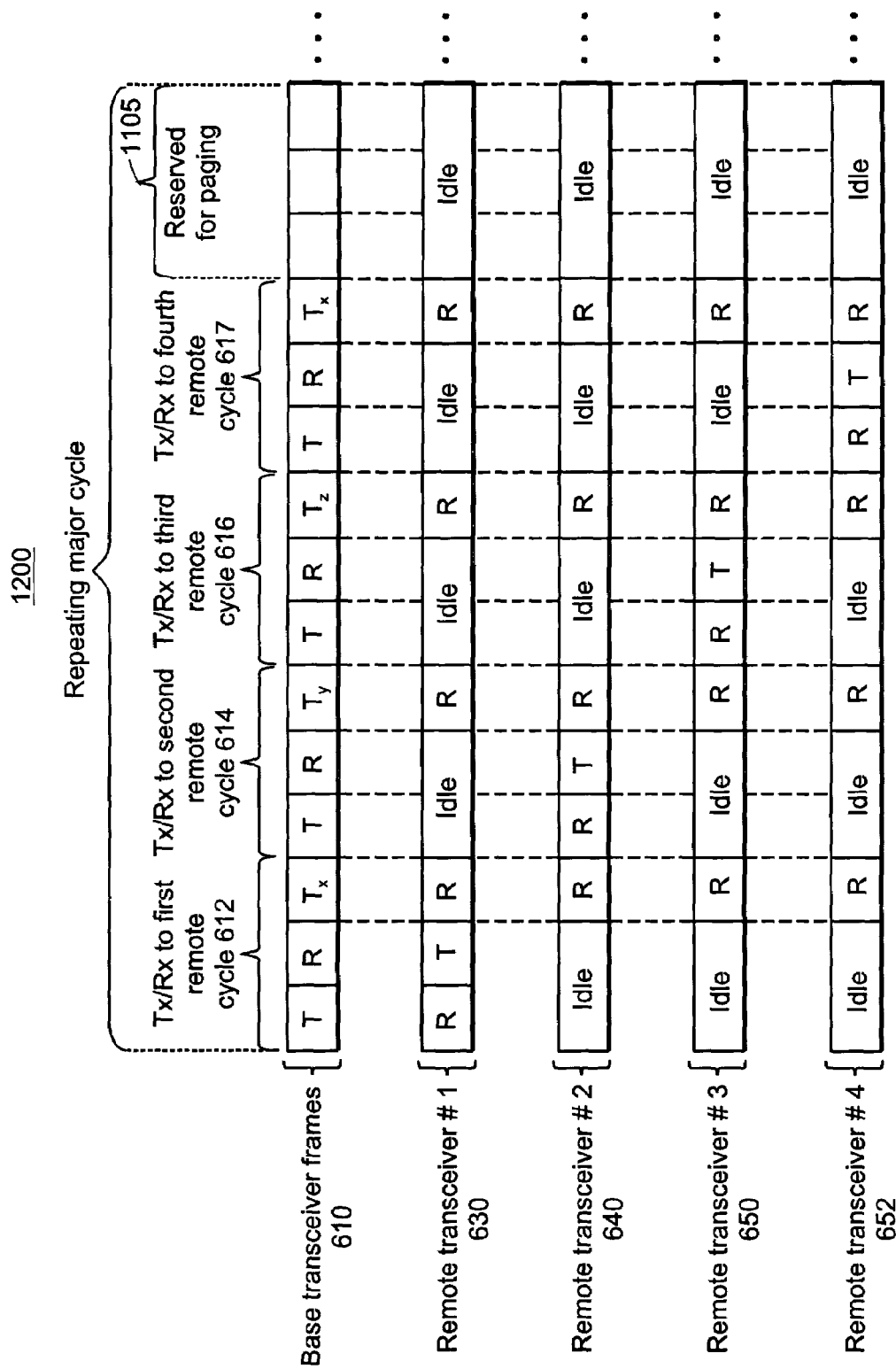
FIG. 12 is a timing diagram illustrating how bandwidth can be dynamically allocated to a new remote transceiver according to certain principles of the present invention.
Figure 13:
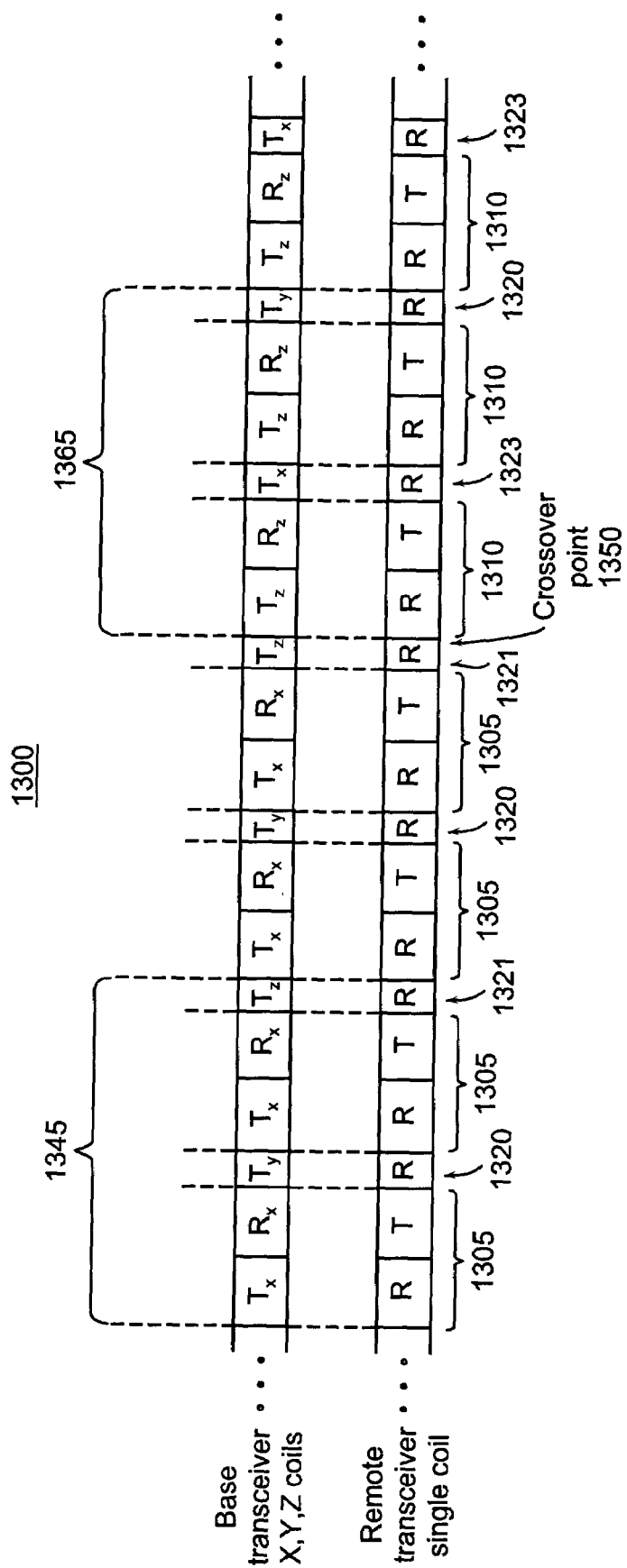
FIG. 13 is a timing diagram illustrating a method of implementing diversity checks according to certain principles of the present invention.

FIG. 8 is a timing diagram more particularly illustrating transmission of a paging signal by remote transceiver 116 while it is in the paging mode. Multiple messages can be transmitted in a sequence of frames.

While in the sleep mode, base transceiver 120 attempts to detect paging signals on each of three transducer elements during different time intervals. Based on orientation, it is possible that one or even two of the transducers in base transceiver 120 can not detect the paging signal generated by remote transceiver 116. To account for this condition, base transceiver 120 intermittently listens on each of different transducer elements during different time durations to detect paging signals from remote transceiver 116. At least one transducer in base transceiver will be able to detect a paging signal.

The process of receiving a signal on different transducers can be achieved by including a multiplexer circuit in base transceiver 120 so that a corresponding receiver can be selectively coupled to each of different transducers at different times. A use of a multiplexer circuit can reduce the number of receivers in a transceiver device.

While in the sleep mode, base transceiver 120 does not necessarily transmit information as shown in the timing diagram of FIG. 4. Rather, base transceiver 120 occasionally listens for paging signals transmitted by a remote transceiver 116. A sequence of bits in a paging message such as preamble bits 425 and sync bits 430 can be used to synchronize base transceiver 120 and remote transceiver 116.

Since base transceiver 120 and remote transceiver 116 can initially be out of phase with each other prior to establishing a formal two-way communication link, remote transceiver 116 can shift the phase of the paging signal so that it eventually can be detected by a base transceiver 120 in the sleep mode. In one application, remote transceiver 116 shifts the phase of its timing by 180□ or some incremental amount after determining that no signal was received within a time period. Thus, base transceiver 120 can eventually detect a transmitted paging signal if it is within range of remote transceiver 116.

Based on this technique, if both transceivers are transmitting and receiving at the same time, one transceiver can shift the phase of its transmit and receive cycle relative to the second device so that the transceiver devices can communicate.

Referring again to FIG. 5, if base transceiver 120 does not respond to the presence of a paging signal transmitted by remote transceiver 116 in step 524, process flow continues to step 526, which determines whether a timeout has occurred. If base transceiver 120 does not respond within a time period of several seconds or other predetermined amount of time, it is presumed that there is no base transceiver 120 with which to connect and remote transceiver 116 is set to the sleep mode again in step 515.

In the event that remote transceiver 116 receives a response from base transceiver 120 in step 524 as a result of transmitting a paging signal, process flow continues at step 530. It is determined in step 530 whether base transceiver 120 acknowledges that a valid communication code 470 was transmitted by remote transceiver 116 in a previous paging message. For example, if a communication code 470 was previously established for use between headset 110 and cell phone 130, this code can be sent in paging signals from remote transceiver 116. Thus, base transceiver 120 can determine, based upon receipt of a paging signal and value of a communication code 470 in the paging message, whether remote transceiver 116 has been initialized with a non-factory programmed communication code 470. More specifically, a base transceiver 120 can determine whether it previously communicated with remote transceiver 116 based on code 470. A factory programmed code can be unique such as all zeros so that the base transceiver 120 can determine whether remote transceiver 116 has ever been previously initialized. Alternatively, a unique communication code for a Amatched@ headset 110 and base can be factory programmed prior to shipment.

If base transceiver 120 sends a message to remote transceiver 116 that it did not receive a valid or recognized communication code 470 in a received paging signal in step 530, process flow continues at step 535 where the remote transceiver 116 checks and waits for a queue indicating a desire by a user to initiate an initialization process for establishing a communication code 470 between headset 110 and cell phone 130.

Figure 6:
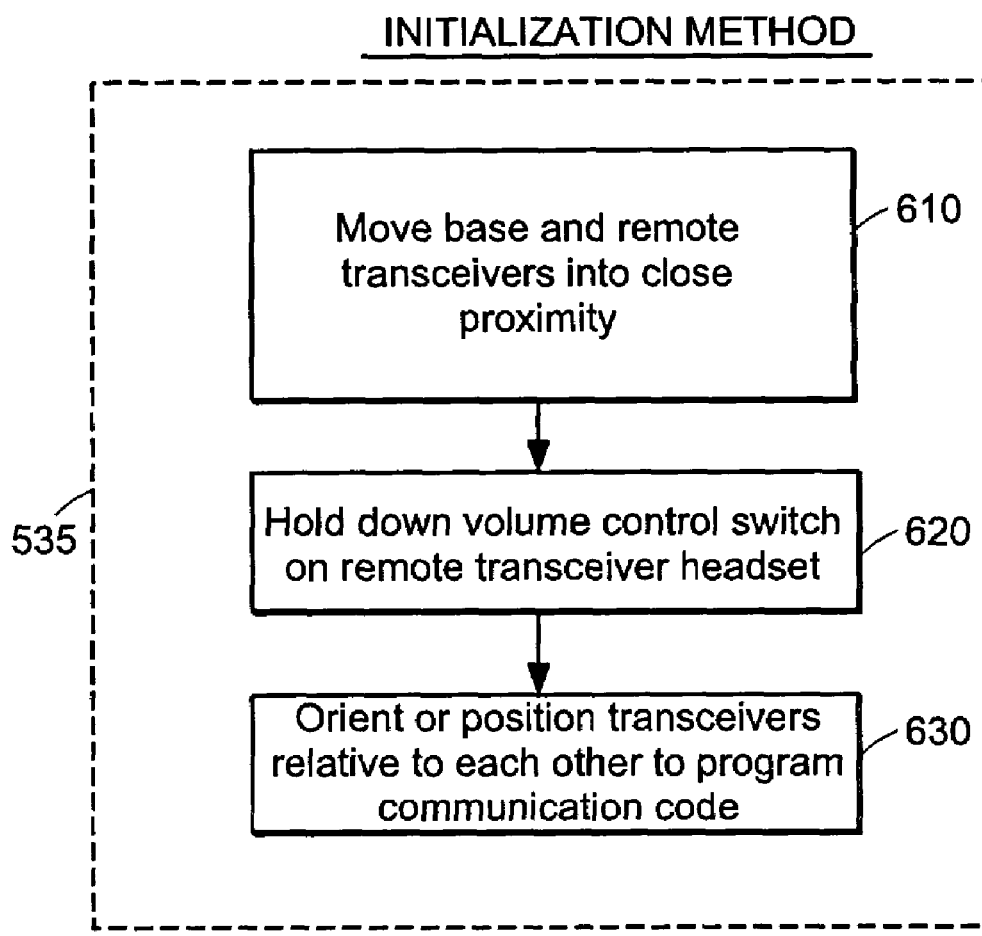
FIG. 6 is a flow chart illustrating a method of activating an initialization process to program a transceiver device with a communication code according to certain principles of the present invention.
Figure 7B:
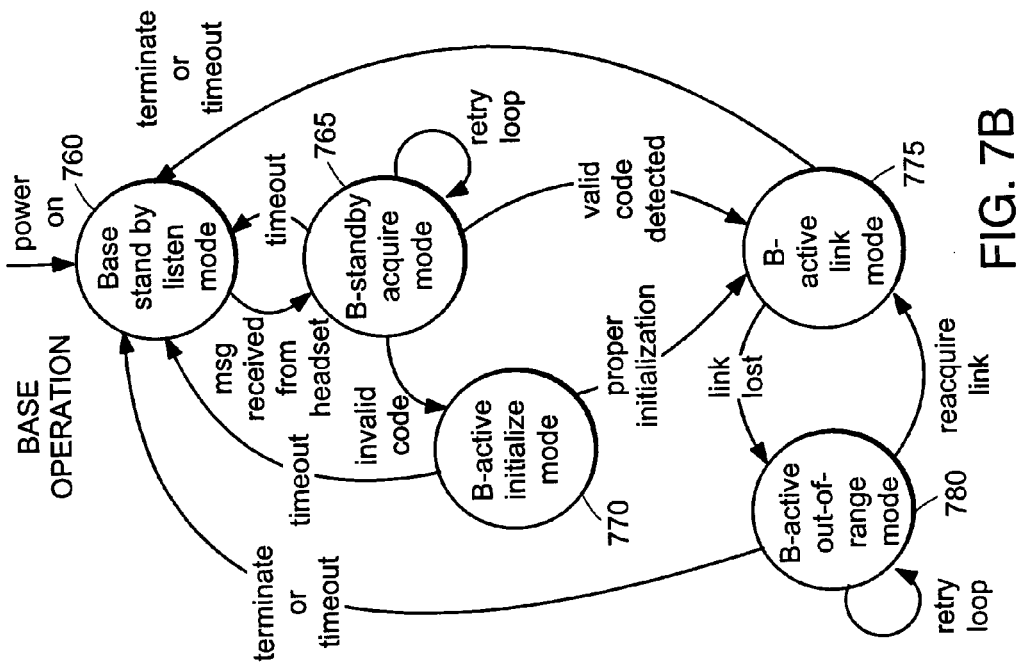
FIGS. 7A and 7B are state diagrams illustrating transceiver modes of operation according to certain principles of the present invention.
Figure 7A:
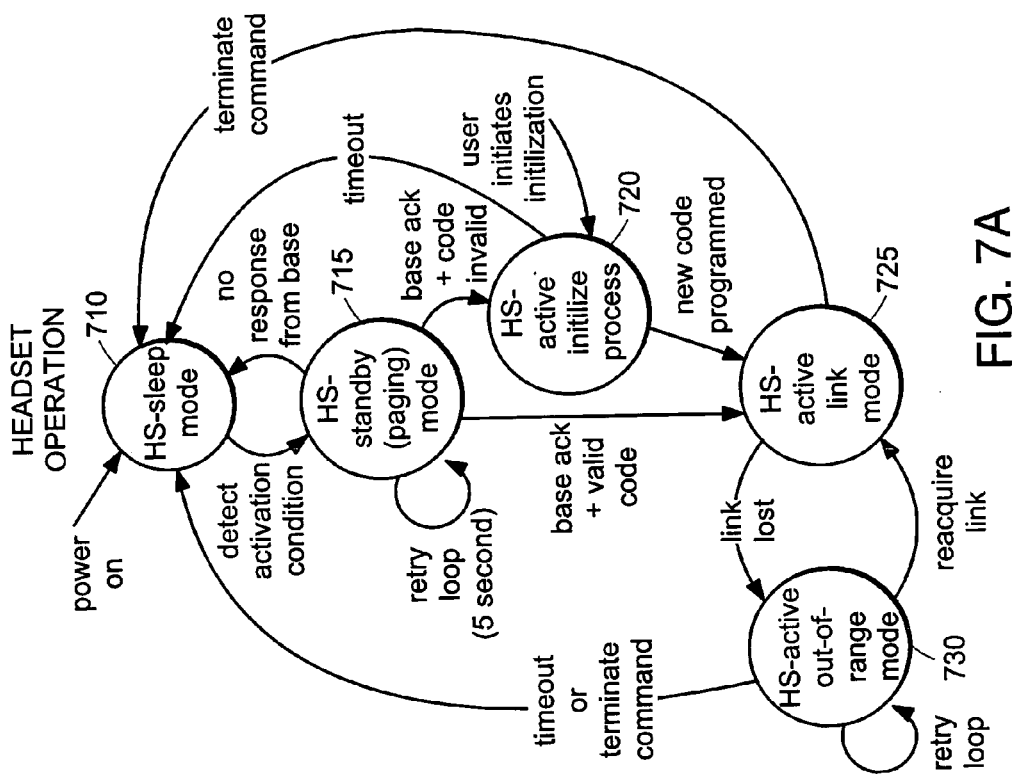

The queue for initiating the initialization process to establish a communication code 470 can vary depending on the application. For example, the method of queuing a remote transceiver 116 can involve steps as shown in FIG. 6. In step 610, base transceiver 120 and remote transceiver 116 can be moved in close proximity to each other, typically less than a foot apart. The proximity or changing proximity can be detected at base transceiver 120 based upon received signal strength.

Additional or alternative activating steps can be used to initiate the initialization process. For example, in step 620, a volume control or other switch on headset 110 can be held down by a user to initiate programming a communication code. An internal electronic signal generated by depressing the switch can be received at remote transceiver 116 can indicate a desire by a user to initiate the programming of a code 470. Thereafter, in step 630, the transceivers are optionally positioned or oriented by a user in a predetermined position with respect to each other to complete an activation process.

Base transceiver 120 can identify an orientation of a received magnetic field using a set of transducers to determine whether headset 110 and, more particularly, remote transceiver 116 is oriented in such a way as to indicate that a user would like to initialize headset 110 and cell phone 130 with a communication code 470. Following detection of the appropriate activation routine, bidirectional communications are established between transceivers to program a new communication code 470.

Other activation protocols can be used to initiate programming of a communication code 470. In one application, strength of an inductive field received at base transceiver 120 is used to determine that a user has initiated the initialization process. It is known that the strength of a received field is a strong function of distance between transceiver devices. Consequently, a transceiver device can detect whether a received signal is above a threshold to determine that the devices are in close proximity. By measuring a signal strength, and therefore approximate distance, an additional constraint can be used to determine a user=s intent to program the devices with a communication initialization code.

As mentioned, an orientation of a received inductive field can be used to activate the initialization process. For example, an inductive field can be received on each of multiple transducers in a transceiver device to determine an orientation of the inductive field and therefore remote transceiver 116. Based on measured characteristics, an orientation of the device transmitting the inductive field can be determined.

In yet another application, a changing orientation over time of, for example, a remote transceiver device relative to another sensing transceiver device can be used to activate an initialization process. More specifically, a headset can be successively and rapidly moved near and far relative to a base transceiver to initiate the initialization process. Also, a headset device can be rotated or moved in a circular fashion to initiate the initialization process.

A combination of conditions can be a prerequisite to activating the initialization function. For example, a user can press an Aprogram@ button to enter a mode in which one or more conditions must be satisfied within a time window for the two devices to proceed programming a new communication code 470 as previously described. Thus, causing an activating condition outside the window during normal bidirectional communications will not cause the transceiver device to become programmed with a new communication code 470.

One method of determining proximity includes sensing strength of a received signal on each of multiple transducers in a transceiver device. Similarly, proximity can be determined by detecting strength of signals on a single transducer received from multiple transducers transmitting at different times.

Fewer transducers can be used if the orientation is predictable relative to the direction of the field being sensed, such as would be possible if a game controller was limited to only one or two degrees of freedom of motion relative to a fixed field generating transducer in a base device.

Range, R, (to a first approximation) is typically a function of the magnetic field strength M that is measured by the field sensing coils and varies in accordance with the following proportional formula:

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of supporting inductive communications among multiple transceivers, the method comprising:
    sharing a wireless bandwidth to sunnort bidirectional communications between pairs selected from at least three transceivers, the at least three transceivers including a base transceiver and at least two remote transceivers with which the base transceiver communicates, the at least two remote transceivers being assigned use of one or more time slots to communicate within a communication cycle;
    disposing at least two transducer elements in the base transceiver and at least one transducer element in each of the at least two remote transceivers to support inductive communications between the transceivers at any angular orientation relative to each other within a range of distance;
    comparing link qualities of communications between different transmit-receive transducer elements for each remote transceiver communicating with the base transceiver;
    selecting transmit-receive pairs of transducer elements to support further communications in respective time slots between the base transceiver and the at least two remote transceivers based on detected link quality;
    generating a signal from a selected transducer element of the at least two transducer elements in the base transceiver; and
    simultaneously receiving the signal on the at least two remote transceivers to compare link qualities of different transducer element pairs.

2. A method as in claim 1 further comprising:
    transmitting a signal from the base transceiver; and
    simultaneously receiving the transmitted signal at each of the at least two remote transceivers to determine link quality.

3. A method as in claim 1, wherein link qualities are compared by determining which of the at least two transducer elements in the base transceiver receives a strongest signal from a transmitting remote transceiver.

4. A method as in claim 3, wherein the strongest signal is determined by comparing amplitudes of a received signal.

5. A method as in claim 1 further comprising:
    transmitting a message from the at least one of the remote transceivers to indicate which of the at least two transducer elements in the base transceiver supports a strongest received signal at the remote transceiver.

6. A method as in claim 1 further comprising:
    allocating at least a portion of the shared wireless bandwidth to receive paging signals from other remote transceivers.

7. A method as in claim 6, wherein at least one of the other remote transceivers generating paging signals attempts to initiate an initialization process to establish a communication code for exclusive communications with the base transceiver.

8. A method as in claim 1, wherein disposing the at least two transducer elements in the base transceiver includes disposing the at least two transducer elements at unique orientations with respect to each other to support communication with the at least two remote transceivers.

9. A system supporting inductive communications among multiple transceivers, the system comprising:
    at least three transceivers sharing a wireless bandwidth that supports bidirectional communications between pairs selected from the at least three transceivers, the at least three transceivers include a base transceiver and at least two remote transceivers with which the base transceiver communicates, the at least two remote transceivers being assigned use of one or more time slots to communicate within a communication cycle;
    at least two transducer elements disposed in the base transceiver and at least one transducer element disposed in each of the at least two remote transceivers to support inductive communications between the at least two remote transceivers at any angular orientation relative to each other within a range of distance, a selected transducer element of the at least two transducer elements in the base transceiver being configured to generate a signal to be simultaneously received on the at least two remote transceivers to compare link qualities of different transducer element pairs;
    a comparator to compare link qualities of communications between different transmit-receive transducer elements in each remote transceiver communicating with the base transceiver; and
    a controller to select which of multiple potential transmit-receive transducer elements is used to support further communications in respective time slots between the base transceiver and the at least two remote transceivers based on detected link quality.

10. A system as in claim 9, wherein a signal is transmitted from the base transceiver and is simultaneously received at each of the at least two remote transceivers to determine link quality.

11. A system as in claim 9, wherein the comparator determines which of the at least two transducer elements in the base transceiver receives a strongest signal from a transmitting remote transceiver.

12. A system as in claim 11, wherein the strongest signal is determined by comparing amplitudes of received signals.

13. A system as in claim 9, wherein a message is transmitted from at least one of the remote transceivers to indicate which of the at least two transducer elements supports a strongest received signal at the at least one remote transceiver.

14. A system as in claim 9, wherein at least a portion of the shared wireless bandwidth is allocated for receiving paging signals from the at least two remote transceivers.

15. A system as in claim 14, wherein at least one of the remote transceivers is configured to generate paging signals to attempt to initiate an initialization process to establish a communication code for exclusive communications with the base transceiver.

16. A system as in claim 9, wherein the least two remote transceivers each include at least two transducer elements at unique orientations with respect to each other to support communication with the base transceiver.

17. A system as in claim 9, wherein bi-directional communications between a pair of transceivers is supported by a selected pair of transmit-receive transducers, each transceiver of the pair of transceivers including one transducer of the transmit-receive pair of transducers.

* * * * *

UNITED STATES PATENT AND TRADEMARK OFFICE
CERTIFICATE OF CORRECTION

| | |
|---|---|
| PATENT NO. | : 7,215,924 B2 |
| APPLICATION NO. | : 11/213624 |
| DATED | : May 8, 2007 |
| INVENTOR(S) | : Vincent Palermo et al. |

Page 1 of 1

It is certified that error appears in the above-identified patent and that said Letters Patent is hereby corrected as shown below:

<u>Column 15</u>
Claim 1, line 40, delete "sunnort" and insert --support--.

Signed and Sealed this

Seventh Day of August, 2007

JON W. DUDAS
*Director of the United States Patent and Trademark Office*